United States Patent

Koyanagi et al.

[11] Patent Number: 6,010,251
[45] Date of Patent: Jan. 4, 2000

[54] LASER DIODE MODULES CONVERGING PARTS, AND OPTICAL COUPLING METHODS

[75] Inventors: Haruki Koyanagi; Tatsuo Hatta, both of Tokyo, Japan

[73] Assignee: Mitsubishi Denki Kabushiki Kaisha, Tokyo, Japan

[21] Appl. No.: 08/821,774

[22] Filed: Mar. 20, 1997

[30] Foreign Application Priority Data

Mar. 25, 1996 [JP] Japan .................................. 8-068214

[51] Int. Cl.⁷ .................................................. G02B 6/36
[52] U.S. Cl. .......................... 385/93; 359/819; 372/108; 372/109
[58] Field of Search ................ 372/43, 45, 108, 372/109; 257/80, 81, 82; 385/90, 92, 93, 94; 359/811, 813, 819

[56] References Cited

U.S. PATENT DOCUMENTS

| | | | |
|---|---|---|---|
| 4,919,506 | 4/1990 | Covey . | |
| 4,981,335 | 1/1991 | Gaebe | 385/33 |
| 5,195,155 | 3/1993 | Shimaoka et al. | 385/90 |
| 5,351,330 | 9/1994 | Jongewaard | 385/93 |
| 5,353,294 | 10/1994 | Shigeno | 372/50 |
| 5,408,493 | 4/1995 | Aoki | 372/107 |
| 5,542,018 | 7/1996 | Kuhara et al. | 372/43 |
| 5,689,378 | 11/1997 | Takashima et al. | 359/813 |
| 5,751,877 | 5/1998 | Ishizaka et al. | 385/93 |
| 5,841,923 | 11/1998 | Kyoya | 385/93 |
| 5,883,748 | 3/1999 | Shum | 359/819 |

FOREIGN PATENT DOCUMENTS

| | | |
|---|---|---|
| 0 063 504 | 10/1982 | European Pat. Off. . |
| 0 638 829 | 2/1995 | European Pat. Off. . |
| 4-66324 | 10/1992 | Japan . |
| 2 178 554 | 2/1987 | United Kingdom . |

OTHER PUBLICATIONS

Patent Abstracts of Japan, vol. 011, No. 015 (P–536), Jan. 16, 1987 & JP 61 189511 A (Canon Inc), Aug. 23, 1986 (English Abstract).

*Primary Examiner*—James W. Davie
*Attorney, Agent, or Firm*—Burns, Doane, Swecker & Mathis, LLP

[57] ABSTRACT

A laser diode module provides methods for coupling laser light and optical fiber which achieve a higher coupling efficiency than conventional methods and is cheaper and easier to assemble without losing conventional high-frequency power supply function. In a laser diode module, a high-frequency electric line 11 to a laser diode is located on the upper surface of a photodiode carrier 4 for supporting a photodiode 3; the photodiode carrier 4 is large with a trapezoidal shape. This shape prevents the surface of the photodiode 3 from returning to the laser diode reflected light emitted from the rear of the laser diode 1. A spherical convexo-plane lens 27 is located so that its spherical surface faces the laser diode 1 and is held on a lens holder 22 with a cylindrical hole at an optimum angle to a slant end of an optical fiber core 23 so that a center of curvature 29 of the spherical surface is on an optical axis 19 of laser light which is collimated by a collimating lens 7.

20 Claims, 3 Drawing Sheets

LASER DIODE MODULES CONVERGING PARTS, AND OPTICAL COUPLING METHODS

BACKGROUND OF THE INVENTION

1. Field of the Invention

The invention relates to laser diode modules having a laser diode, an optical fiber, and optical parts by which light emitted from the laser diode is optically coupled with the optical fiber; converging parts for transmitting light emitted from a laser diode into an optical fiber; and methods of optical coupling laser light and an optical fiber.

2. Description of the Prior Art

FIG. 1 is a cross-sectional view of a conventional laser diode module using a coupling method of a semiconductor laser and an optical fiber, for example, such as disclosed in Japanese Patent Publication No. Hei 4-66324. FIG. 1 shows a laser diode 1; a submount 2 on which the laser diode 1 is mounted; a photodiode 3; a photodiode carrier 4 for supporting the photodiode 3 so that the surface of the photodiode 3 and an optical axis of light emitted from the back side of the laser diode 1 intersect at an angle; a ceramic substrate 5; a base 6 for supporting the submount 2, the photodiode carrier 4, and the ceramic substrate 5; a collimating lens 7 for collimating light emitted from the front side of the laser diode 1; a collimating lens holder 8 for supporting the collimating lens 7; an enclosure 9; a signal pin 10 piercing the enclosure 9; a high-frequency electric line 11 formed on the ceramic substrate 5 for supplying power to the laser diode 1; gold wires 12–15 for connecting the power supply system from the signal pin 10 to the laser diode 1; pads 16 and 17 for bonding gold wires 13–15; a window 18 for preserving the airtightness of the enclosure 9 while allowing the transmitting of light emitted from the front side of the laser diode 1; an optical axis 19 of laser light emitted from the laser diode 1; a converging rod lens 20; a rotation axis 21 of the converging rod lens 20 which is cylindrical in shape the axis 21 being normal to the bases of the rod lens 20; a lens holder 22 joined to the enclosure 9 for holding the converging rod lens 20; an optical fiber 25; a core 23 of the optical fiber 25; a ferrule 24 for fixing and supporting the core 23 and the optical fiber 25; and a ferrule holder 26 for supporting the ferrule 24.

In a laser diode module using such a conventional coupling method of a semiconductor laser and an optical fiber, the converging rod lens 20 is placed so that the axis 21 is parallel to the optical axis 19 of light emitted from the front side of the laser diode 1 which is collimated by the collimating lens 7. As a result, the converging rod lens 20 converges light emitted from the front side of the laser diode 1 and changes the direction of the light's optical axis after it has traveled through the window 18. Converged light from the converging rod lens 20 travels into the core 23 of the optical fiber 25 at an angle depending on an angle of an end of the core 23 of the optical fiber 25 thereby achieving a high coupling efficiency. That is, laser light from the laser diode 1 can be coupled with the optical fiber with a high coupling efficiency.

In addition, the photodiode carrier 4 supports the photodiode 3 so that the surface of the photodiode 3 and the optical axis of light emitted from the back side of the laser diode 1 intersect at an angle. Therefore, the photodiode 3 can monitor the intensity of light emitted from the back side of the laser diode 1 without returning light reflected from the surface of the photodiode 3 in the direction of the optical axis of the incident light.

In this case, the laser diode 1 is electrically joined to the signal pin 10 piercing the enclosure 9 from the outside through the high-frequency electric line 11 on the ceramic substrate 5, the gold wires 12–15, and the pads 16 and 17 formed on the photodiode carrier 4 and the submount 2 respectively. This enables power supply from the signal pin 10 to the laser diode 1.

In a laser diode module using the above conventional coupling method of a semiconductor laser and an optical fiber, the converging rod lens 20 with refractive index distribution having symmetry about its central axis is used to converge light. Therefore, it has a fault that, even if an angle of incidence of laser light to the core 23 of the optical fiber with a slant end is optimized, high coupling efficiency cannot be achieved. Furthermore, ceramic substrate 5 must be added to supply power to the laser diode 1 with a good frequency characteristic. This results in increase in the number of parts mounted on the base 6, which is unfavorable to assembly.

SUMMARY OF THE INVENTION

Accordingly, the first object of the invention is to provide laser diode modules which cheaply achieve a high coupling efficiency by minimizing aberration and coupling laser light at an optimum angle with an optical fiber with a slant end.

In order to accomplish this object, a laser diode module of the invention has a spherical convexo-plane lens which is fixed so that a rotation axis of the spherical convexo-plane lens is at an angle to an optical axis of laser light emitted from the front side of a laser diode or light obtained by collimating this laser light with a collimating lens.

If laser light is coupled with the optical fiber with the spherical convexo-plane lens thus fixed on a lens holder so that the rotation axis of the spherical convexo-plane lens and the optical axis of the collimated incident laser light form an angle calculated from formula (1), converged laser light at an angle to a core of the optical fiber which gives the highest coupling efficiency can be easily obtained without inserting an extra optical part on an optical path of the laser light.

The second object of the invention is to provide chip carriers which are cheap and favorable to assembly with fewer parts.

In order to accomplish this object, a laser diode module of the invention has a chip carrier, whose photodiode carrier for fixing and supporting a photodiode on a base has a high-frequency electric line to a laser diode on it.

According to another aspect of the invention, the above photodiode carrier is a trapezoid plate.

According to another aspect of the invention, a surface of the above photodiode carrier for fixing and supporting a photodiode slants to the base.

According to another aspect of the invention, the above photodiode carrier is a rectangular plate and fixed onto the base with its sides not parallel to the sides of the base by turning it on an axis normal to the surface of the base.

In addition, according to another aspect of the invention, the above base has a concavity on its upper surface where a rectangular photodiode carrier plate is mounted.

According to another aspect of the invention, the above base has a difference in level on its upper surface where a rectangular photodiode carrier plate is mounted.

According to another aspect of the invention, the above base has projections on its upper surface at the edge of the position where a rectangular photodiode carrier plate is mounted.

According to another aspect of the invention, the upper surface of the above base on which the photodiode carrier is mounted slants to its lower surface.

By thus forming the high-frequency electric line to the laser diode on the upper surface of the large photodiode carrier, power with a good frequency characteristic can be supplied to the laser diode from the outside of an enclosure without mounting an extra ceramic substrate for power supply wiring.

In addition, by using a trapezoidal photodiode carrier, adopting a formation where one surface of a photodiode carrier as slants to the surface of the base, or locating a rectangular photodiode carrier plate on the base with its sides not parallel to the sides of the base, light emitted from the back side of the laser diode can be prevented from easily returning to the laser diode after it is reflected by the surface of the photodiode and a very cheap photodiode carrier can be obtained.

Furthermore, by forming on the upper surface of the base a concavity, a difference in level, or one or more projections and locating a rectangular photodiode carrier plate to them diagonal to the base, a very inexpensive photodiode carrier can be easily fixed in the correct position.

And by locating a photodiode carrier on a base with a slant upper surface, light emitted from the back side of the laser diode can be prevented from easily returning to the laser diode after it is reflected by the surface of the photodiode.

The third object of the invention is to provide cheap converging parts which can minimize aberration and couple laser light at an optimum angle with an optical fiber with a slant end.

In order to accomplish this object, converging parts of the invention include a spherical convexo-plane lens and a lens holder for supporting it, wherein the lens holder has a cylindrical hole for holding the spherical convexo-plane lens so that a center of curvature of a spherical surface of the spherical convexo-plane lens is on an optical axis of incident laser light and the optical axis of the incident laser light and a rotation axis of the spherical convexo-plane lens form an angle depending on an angle of a slant end of an optical fiber.

By thus mounting a spherical convexo-plane lens on a lens holder with a cylindrical hole at an angle depending on an angle of a slant end of an optical fiber, converging parts for converging laser light into an optical fiber at an angle which maximizes a coupling efficiency for a given angle of the end of the optical fiber core can be obtained.

The fourth object of the invention is to provide optical coupling methods which achieve a higher coupling efficiency for a fiber with a slant end.

In order to accomplish this object, with coupling methods of a laser diode and an optical fiber core of the invention, a spherical convexo-plane lens is located so that a center of curvature of its spherical surface is on an optical path of laser light and its plane surface and the optical path of the laser light form an angle other than 90°; and the direction of the laser light is changed by an optimum angle depending on an angle of an end of an optical fiber from the direction of an optical axis of incident light.

By thus locating a spherical convexo-plane lens so that a center of curvature of a spherical surface of the spherical convexo-plane lens is on an optical path of laser light and an optical axis of the laser light and a rotation axis of the above spherical convexo-plane lens form an optimum angle depending on an angle of an end of an optical fiber; laser light can be coupled with an optical fiber at an optimum angle.

DESCRIPTION OF THE PREFERRED EMBODIMENTS

Preferred Embodiment 1

Figure 1:
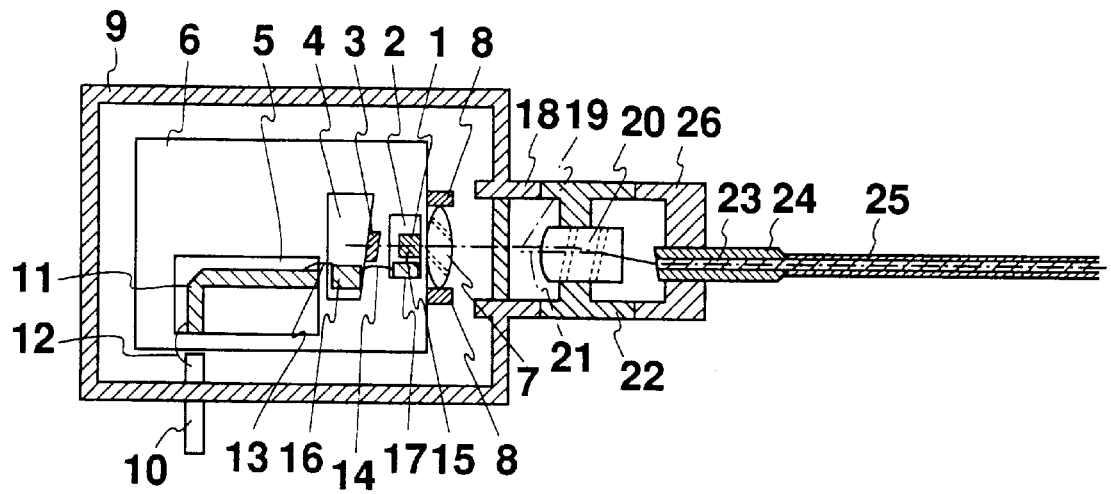
FIG. 1 is a cross-sectional view showing a conventional laser diode module.
Figure 2:
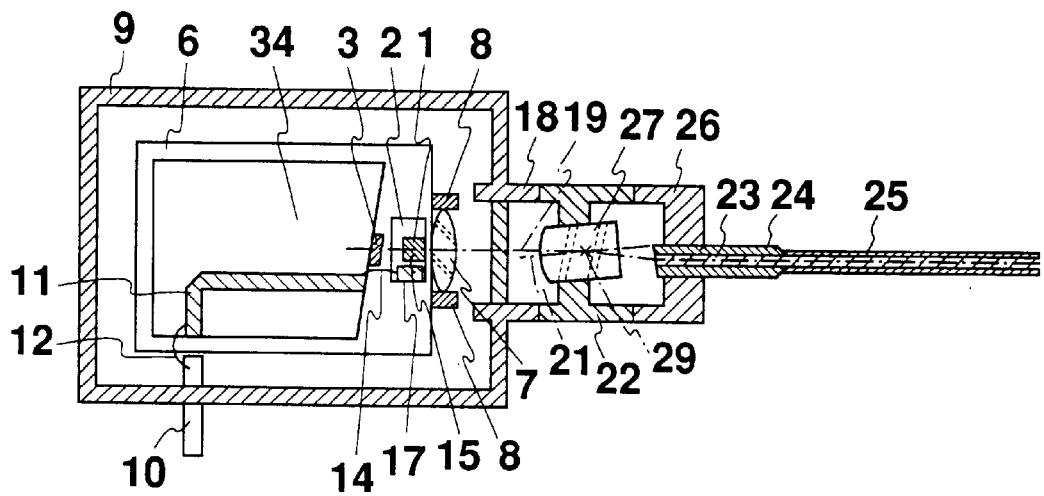
FIG. 2 is a cross sectional view, from above, of a laser diode module of the preferred embodiment 1 of the invention and shows its optical coupling method.
Figure 3:
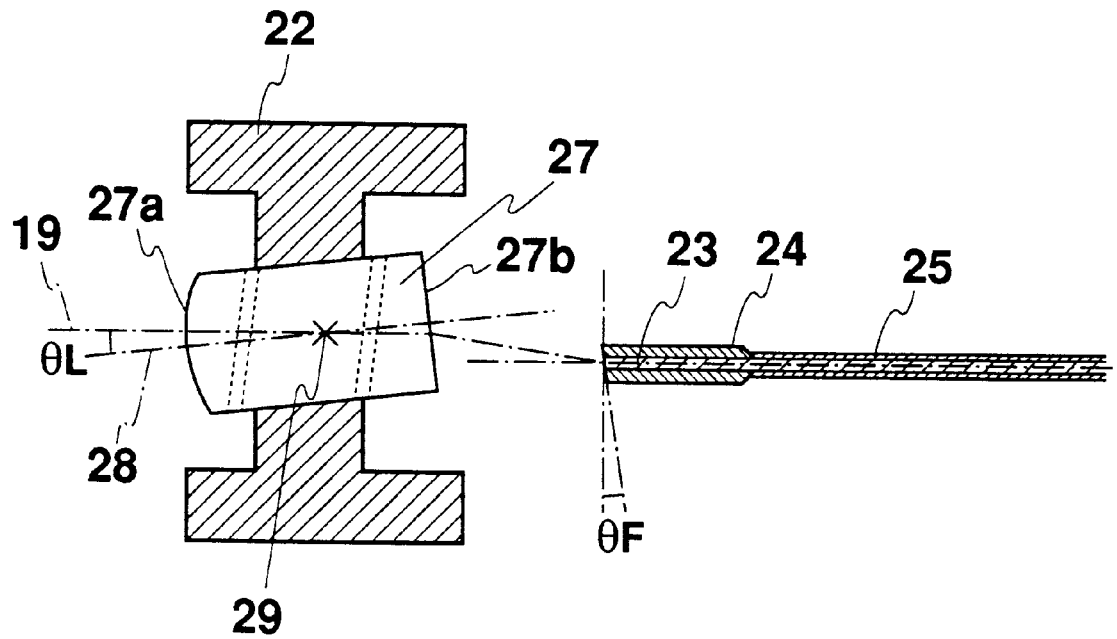
FIG. 3 is a cross-sectional view of converging parts in a laser diode module of the preferred embodiment 2 of the invention.

FIG. 2 shows a top view of a laser diode module, one preferred embodiment of the invention. The parts numbered 1–3 in FIG. 2 correspond to those in the above conventional apparatus, and are therefore not described here. A large photodiode carrier 34 supports a photodiode 3 so that the surface of the photodiode 3 and an optical axis of light emitted from a back side of a laser diode 1 form an angle other than 90°. The photodiode carrier 34 in this preferred embodiment is trapezoidal. The parts numbered 6–26 in FIG. 2 correspond to those in the above conventional apparatus, and so are not described again here. A spherical convexo-plane lens 27 is a spherical convexo-plane lens for coupling laser light with the core 23 of the optical fiber 25. An axis 28 is a rotation axis of the spherical convexo-plane lens 27. A center of curvature 29 is a center of curvature of a spherical Ail surface of the spherical convexo-plane lens 27. The spherical convexo-plane lens 27 comprises a spherical surface 27a having the center of curvature 29 on the axis of symmetry for rotation 28 and a plane surface 27b intersecting the rotation axis 28 of the spherical convexo-plane lens 27 at right angles. For converging parts and a method of optical coupling with this converging parts shown in FIG. 3, the spherical convexo-plane lens 27 is located so that the spherical surface 27a is on the laser diode side and the center of curvature 29 of the spherical surface 27a is on the optical axis 19 of incident laser light collimated by the collimating lens 7. An optimized inclination $\theta_L$ of the spherical convexo-plane lens 27 to the optical axis 19 is given by formula (1) derived from Snell's law. In this formula, $n_L$ is a refractive index of the spherical convexo-plane lens 27; $n_F$ is a refractive index of the core 23 of the optical fiber 25; $\theta_F$ is an angle of an end of the core 23 of the optical fiber 25. The lens holder 22 holds the spherical convexo-plane lens 27 at an angle of $\theta_L$. For example, if the material of a lens is BK7 ($n_L$=1.50), the refractive index of the core of the optical fiber $n_F$=1.47, and the angle of the end of the core of the optical fiber $\theta_F$=8.0°, formula (1) gives an inclination $\theta_L$ of the spherical convexo-plane lens of 7.53°. This means that inclining the lens 27 by 7.53° to the optical axis 19 couples laser light, at the maximum efficiency, with the core of the optical fiber the end of which is ground at an angle of 8°.

FORMULA 1 (1)

$$\theta_L = \tan^{-1}\left[\frac{\sin\{\sin^{-1}(n_F \cdot \sin\theta_F) - \theta_F\}}{n_L - \cos\{\sin^{-1}(n_F \cdot \sin\theta_F) - \theta_F\}}\right]$$

In the laser diode module shown in FIG. 2, the high-frequency electric line 11 to the laser diode hitherto formed on the surface of the ceramic substrate 5 is formed on the surface of the photodiode carrier 34. That is, the conventional photodiode carrier 4 and ceramic substrate 5 of the same thickness are combined into the photodiode carrier 34, resulting in less parts and easier assembly. Furthermore, the trapezoidal photodiode carrier 34 holds the photodiode 3 so that the reflected light from the surface of the photodiode 3 does not return to the laser diode 1. The big photodiode carrier 34 enables, for example, the high-frequency electric line to the photodiode 3 to be formed on the photodiode carrier 34, which leads to effective use of the area of the upper surface of the base 6.

The spherical convexo-plane lens converges and refracts through its spherical surface 27a and plane surface 27b light emitted from the front side of the laser diode 1 which is collimated by the collimating lens 7 and then travels through the airtight window 18. In this case, locating the center of curvature 29 of the spherical surface of the spherical convexo-plane lens on the optical axis 19 of collimated laser light makes the aberration of the converged light into the core 23 of the optical fiber relatively low. The plane 27b of the spherical convexo-plane lens slants to the optical axis 19 of the collimated laser light so that the plane 27b refracts the converged light into the core 23 of the optical fiber. As a result, the optical axis of the converged light slants to the optical axis 19 and an inclination of the spherical convexo-plane lens to achieve a high coupling efficiency can be obtained from formula (1) with a given angle of the end of the core 23 of the optical fiber.

Preferred Embodiment 2

In the formation of the above preferred embodiment 1, laser light which is collimated by the collimating lens 7 and then travels through the airtight window 18 reaches the spherical convexo-plane lens 27. However, if a formation in which a spherical convexo-plane lens 27 alone is used to couple laser light with a core 23 of an optical fiber is adopted, a collimating lens 7 does not need to be used.

Furthermore, in the formation of the above preferred embodiment 1, the spherical convexo-plane lens is located so that the spherical surface 27a faces to the laser diode 1; because as the side of the spherical convexo-plane lens 27 from which the collimated laser light travels, the side of the spherical surface 27a is better in terms of aberration. From a viewpoint of converging laser light into the core 23 of the optical fiber at an incident angle maximizing a coupling efficiency, however, it is clear that even if the spherical convexo-plane lens is located so that the spherical surface 27a faces the optical fiber 25, the same effect can be obtained.

And in the above preferred embodiment 1, a trapezoidal photodiode carrier plate is used, but the same effect can be obtained even if the surface side of a photodiode carrier plate where the photodiode is mounted slants to the base 6.

Figure 4:
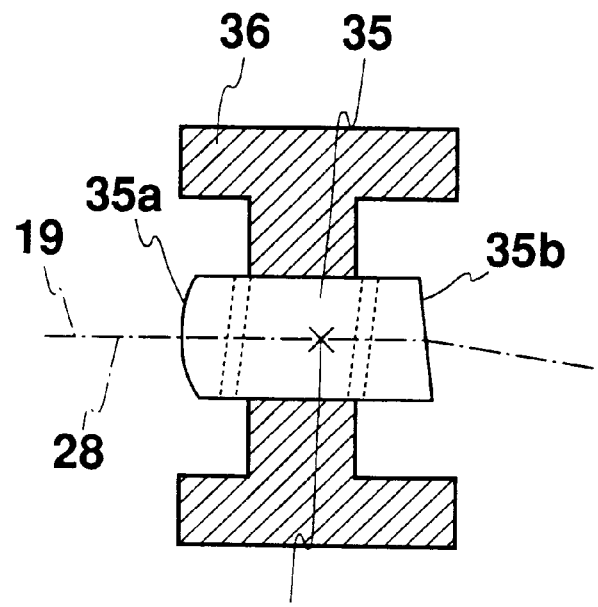
FIG. 4 is a cross-sectional view of converging parts showing the preferred embodiment 3 of the invention.

In the above preferred embodiment 1, the converging parts comprise the spherical convexo-plane lens 27 and the lens holder 22 for holding the spherical convexo-plane lens 27 at an optimized inclination of $\theta_L$ given by formula (1) derived from Snell's law. On the other hand, it is clear that if converging parts comprise, as shown in FIG. 4, a spherical convexo-plane lens 35 with a spherical surface 35a having a center of curvature on a rotation axis 28 of the spherical convexo-plane lens 35 and a plane surface 35b slanting to the axis 28 by an optimized inclination of $\theta_L$ given by formula (1) and a lens holder 36 for holding the spherical convexo-plane lens 35 so that the axis 28 of the spherical convexo-plane lens 35 corresponds to an optical axis 19 of incident laser light, the same coupling method can be achieved.

Furthermore, in the above preferred embodiment 1 there is no optical part between the airtight window 18 and the spherical convexo-plane lens 27; but an optical part, for example an optical isolator, which does not change the direction of the optical axis of incident light may be freely inserted between the airtight window 18 and the spherical convexo-plane lens 27 or 35 without a bad influence upon the function of the spherical convexo-plane lens 27 or 35.

Preferred Embodiment 3

Figure 5:
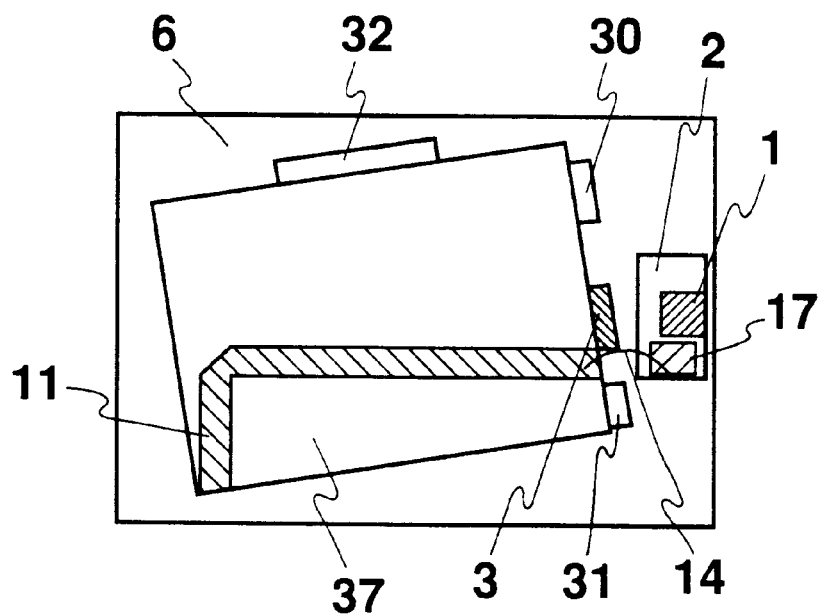
FIG. 5 is a top view of a chip carrier showing the preferred embodiment 4 of the invention.

FIG. 5 shows a top view of a formation of a chip carrier of a laser diode module, preferred embodiment 3. In this laser diode module a rectangular photodiode carrier plate 37 is used as a chip carrier and mounted, as shown in FIG. 5, on a base 6 with its sides not parallel to the sides of the base. Locating projections 30–32 are formed on the upper surface of the base 6 and the photodiode carrier 37 is fixed to these projections with its sides not parallel to the sides of the base 6.

According to the preferred embodiment shown in FIG. 5, a photodiode 3 can monitor, as heretofore, the intensity of light emitted from the rear of a laser diode 1 without returning the reflected light from the surface of the photodiode 3 to the laser diode 1 thereby minimizing the length of gold wire connecting a power supply system to the laser diode 1, which is favorable to a frequency characteristic.

In addition, the number of parts is, as in the above preferred embodiments, fewer than that of a conventional formation and the rectangular photodiode carrier plate 37 is easy to manufacture, the locating projections 30–32 bring about far easier assembly, and a cheap chip carrier can therefore be used.

Preferred Embodiment 4

The formation of the above preferred embodiment 3 has projections 30–32 formed on the upper surface of the base 6 to locate the photodiode carrier 37, but if a concavity or a difference in level is formed at the same position as a locating mark instead of the projections 30–32 formed on the base, the same effect can be obtained.

Preferred Embodiment 5

Figure 6:
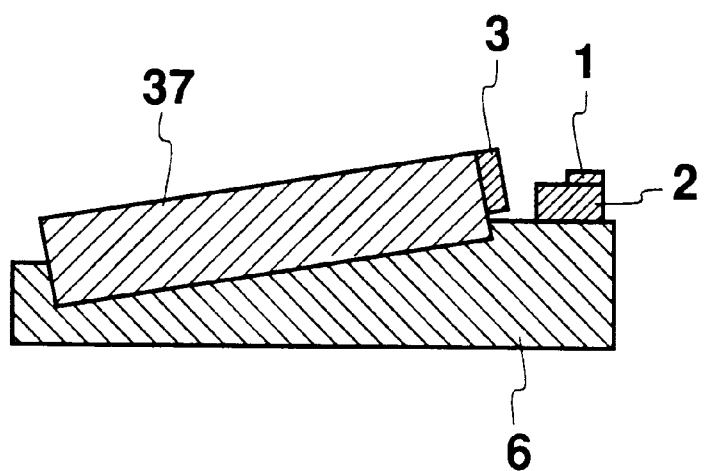
FIG. 6 is a cross-sectional view of a chip carrier showing the preferred embodiment 5 of the invention.

If the sectional thickness of a base 6 is varied according to the position, as shown in FIG. 6, so that the laser diode side is thicker; a photodiode carrier 37 slants to the lower surface of the base simply by fixing the photodiode carrier 37 on the slanted upper surface of the base, resulting in the same effect as in the above preferred embodiment 3.

Of course, if the sectional thickness of the base 6 is varied according to position so that the laser diode side is thinner than the other side, the same effect can be obtained. While there has been described what are at present considered to be preferred embodiments of the invention, it will be understood that various modifications may be made thereto, and it is intended that the appended claims cover all such modifications as fall within the true spirit and scope of the invention.

What is claimed is:

1. A laser diode module comprising:

a laser diode;

a collimating lens for collimating light emitted from the front side of said laser diode;

a spherical convexo-plane lens for converging laser light collimated by said collimating lens;

an optical fiber coupled with laser light converged by said spherical convexo-plane lens; and a lens holder for holding said spherical convexo-plane lens so that a rotation axis of the spherical convexo-plane lens forms with an optical axis of collimated laser light a non-zero optimum angle depending on a non-zero angle of an end of an optical fiber.

2. A laser diode module according to claim 1, further comprising:

a photodiode carrier plate having a high-frequency electric line for supplying power to said laser diode;

a photodiode fixed on and supported by one side of said photodiode carrier plate; and a base for supporting said photodiode carrier plate.

3. A laser diode module according to claim 2, wherein the photodiode carrier plate is a trapezoid in shape.

4. A laser diode module according to claim 2, wherein a surface of the photodiode carrier plate on which the photodiode is fixed slants relative to the base.

5. A laser diode module according to claim 2, wherein a rectangular photodiode carrier plate is fixed on the base having sides not parallel to the sides of the base.

6. A laser diode module according to claim 5, wherein a concavity is formed on the upper surface of the base and the rectangular photodiode carrier plate is fixed to the concavity so that the photodiode carrier plate slants relative to the base.

7. A laser diode module according to claim 5, wherein a difference in level is formed on the upper surface of the base and the rectangular photodiode carrier plate is fixed to the difference in level so that the photodiode carrier slants relative to the base.

8. A laser diode module according to claim 5, wherein projections are formed on the upper surface of the base and the rectangular photodiode carrier plate is fixed to said projections so that the photodiode carrier slants to the base.

9. A laser diode module according to claim 5, wherein the upper surface of the base slants to the lower surface of the base.

10. A laser diode module comprising:

a laser diode;

a spherical convexo-plane lens for converging light emitted from the front side of said laser diode;

an optical fiber coupled with laser light converged by said spherical convexo-plane lens; and a lens holder for holding said spherical convexo-plane lens so that a rotation axis of the spherical convexo-plane lens forms with an optical axis of light emitted from said laser diode a non-zero optimum angle depending on a non-zero angle of an end of an optical fiber.

11. A laser diode module according to claim 10, further comprising:

a photodiode carrier plate having a high-frequency electric line for supplying power to said laser diode;

a photodiode fixed on and supported by one side of said photodiode carrier plate; and a base for supporting said photodiode carrier.

12. A laser diode module according to claim 11, wherein the photodiode carrier plate is trapezoid in shape.

13. A laser diode module according to claim 11, wherein a surface of the photodiode carrier plate the photodiode is fixed on slants relative to the base.

14. A laser diode module according to claim 11, wherein a rectangular photodiode carrier plate is fixed on the base with its sides not parallel to the sides of the base by turning it on the axis normal to the surface of the base.

15. A laser diode module according to claim 14, wherein a concavity is formed on the upper surface of the base and the, rectangular photodiode carrier plate is fixed to the concavity so that the photodiode carrier slants relative to the base.

16. A laser diode module according to claim 14, wherein a difference in level is formed on the upper surface of the base and the rectangular photodiode carrier plate is fixed to the difference in level so that the photodiode carrier plate slants relative to the base.

17. A laser diode module according to claim 14, wherein projections are formed on the upper surface of the base and the rectangular photodiode carrier plate is fixed to said projections so that the photodiode carrier slants relative to the base.

18. A laser diode module according to claim 14, wherein the upper surface of the base slants to the lower surface of the base.

19. Converging parts comprising:

a lens holder with a cylindrical opening portion at a non-zero angle depending on a non-zero angle of a slant end of an optical fiber; and a spherical convexo-plane lens mounted in the cylindrical opening portion.

20. A method of optical coupling of laser light and an optical fiber, wherein by locating a spherical convexo-plane lens so that a center of curvature of a spherical surface of the spherical convexo-plane lens is on an optical path of laser light and an optical axis of the laser light and a rotation axis of the spherical convexo-plane lens from a non-zero optimum angle depending on a non-zero angle of an end of an optical fiber, the laser light can be coupled with the optical fiber at an optimum angle to its end.

* * * * *